US012695617B2

(12) United States Patent
Panshin et al.

(10) Patent No.: US 12,695,617 B2
(45) Date of Patent: Jul. 28, 2026

(54) LOGIC CIRCUITRY PACKAGES STORING TOKENS

(71) Applicant: Hewlett-Packard Development Company, L.P., Spring, TX (US)

(72) Inventors: Stephen D. Panshin, Corvallis, OR (US); Jefferson P. Ward, Vancouver, WA (US); Michael Peeters, Tourinnes-la-Grosse (BE)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 19/182,590

(22) Filed: Apr. 18, 2025

(65) Prior Publication Data

US 2025/0247236 A1      Jul. 31, 2025

Related U.S. Application Data

(63) Continuation of application No. PCT/US2023/027422, filed on Jul. 11, 2023.

(51) Int. Cl.
*H04L 9/32*          (2006.01)
*H04L 9/08*          (2006.01)

(52) U.S. Cl.
CPC .......... *H04L 9/3213* (2013.01); *H04L 9/0825* (2013.01); *H04L 9/3247* (2013.01); *H04L 9/3268* (2013.01); *H04L 9/3271* (2013.01)

(58) Field of Classification Search
CPC ... H04L 9/3213; H04L 9/0825; H04L 9/3247; H04L 9/3268; H04L 9/3271

USPC ......................................................... 713/172
See application file for complete search history.

(56) References Cited

U.S. PATENT DOCUMENTS

| | | |
|---|---|---|
| 9,770,915 B1 | 9/2017 | Ness et al. |
| 9,893,893 B2 | 2/2018 | Ness et al. |
| 9,961,234 B1 | 5/2018 | Panshin et al. |
| 10,680,822 B2 | 6/2020 | Panshin et al. |
| 2003/0198082 A1 | 10/2003 | Silverbrook et al. |
| 2009/0282243 A1 | 11/2009 | Rose et al. |
| 2011/0208966 A1 | 8/2011 | Silverbrook |
| 2016/0127134 A1 | 5/2016 | Goldstone et al. |
| 2017/0359358 A1* | 12/2017 | Alattar .................. G06Q 20/12 |
| 2017/0366350 A1* | 12/2017 | Ness .................. G06F 12/1408 |
| 2019/0238345 A1* | 8/2019 | Gage ..................... H04L 9/088 |
| 2019/0342098 A1* | 11/2019 | Panshin ................ H04L 9/3226 |
| 2021/0243026 A1* | 8/2021 | Mohassel ............... H04L 9/085 |
| 2021/0312021 A1 | 10/2021 | Enomoto |

FOREIGN PATENT DOCUMENTS

| | | | |
|---|---|---|---|
| JP | 2006185184 A | * | 7/2006 |
| WO | 2023/059327 A1 | | 4/2023 |

* cited by examiner

*Primary Examiner* — Moeen Khan
(74) *Attorney, Agent, or Firm* — Foley & Lardner LLP

(57)          ABSTRACT

A logic circuitry package includes an interface to communicate with a host logic circuit and a logic circuit. The logic circuit is configured to store or generate a plurality of tokens corresponding to respective token indices. The logic circuit is configured to receive at least one challenge command from the host logic circuit including a subset of token indices. The logic circuit is configured to in response to the at least one challenge command, transmit a list of data including a subset of tokens of the plurality of tokens corresponding to the received subset of token indices.

14 Claims, 8 Drawing Sheets

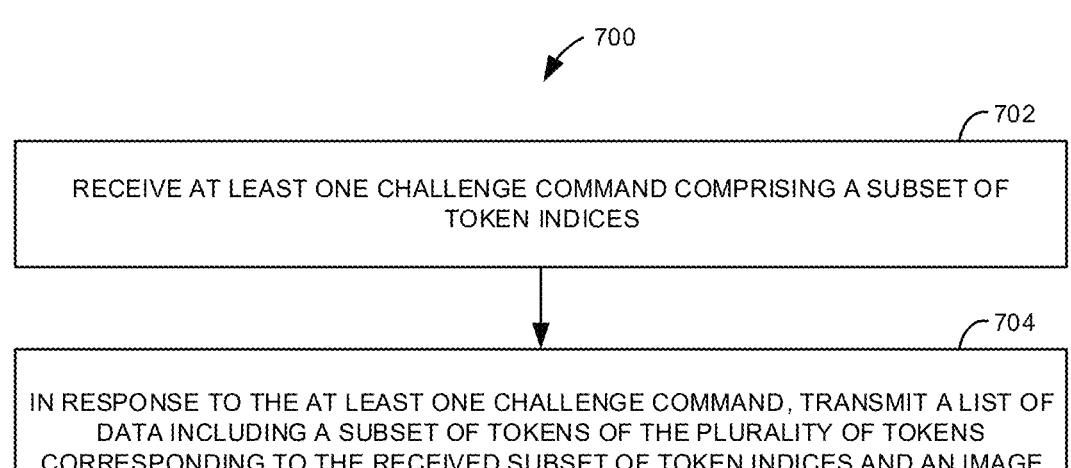

702

RECEIVE AT LEAST ONE CHALLENGE COMMAND COMPRISING A SUBSET OF TOKEN INDICES

704

IN RESPONSE TO THE AT LEAST ONE CHALLENGE COMMAND, TRANSMIT A LIST OF DATA INCLUDING A SUBSET OF TOKENS OF THE PLURALITY OF TOKENS CORRESPONDING TO THE RECEIVED SUBSET OF TOKEN INDICES AND AN IMAGE OF EACH TOKEN OF REMAINING TOKENS OF THE PLURALITY OF TOKENS NOT CORRESPONDING TO THE RECEIVED SUBSET OF TOKEN INDICES

FIG. 7A

700

706

TRANSMIT THE LIST OF DATA OVER A PLURALITY OF TRANSMISSIONS TO THE HOST LOGIC CIRCUIT

FIG. 7B

700

708

TRANSMIT THE LIST OF DATA OVER A PLURALITY OF TRANSMISSIONS TO THE HOST LOGIC CIRCUIT, IN RESPONSE TO A PLURALITY OF CHALLENGE COMMANDS

FIG. 7C

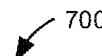

700

710

TRANSMIT A TOKEN IMAGE DIGEST OF A PLURALITY OF TOKEN IMAGES, EACH TOKEN IMAGE OF THE PLURALITY OF TOKEN IMAGES CORRESPONDING TO A RESPECTIVE TOKEN OF THE PLURALITY OF TOKENS

FIG. 7D

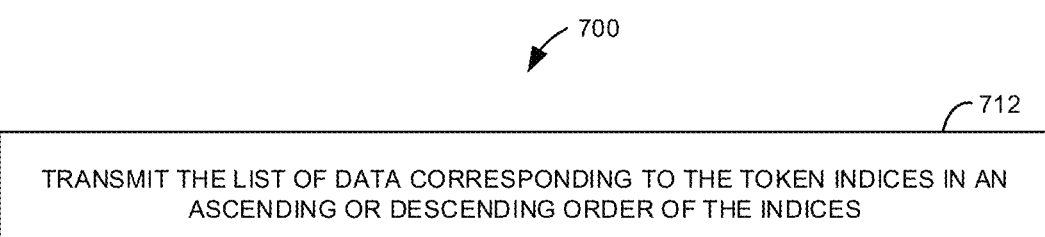

700

712

TRANSMIT THE LIST OF DATA CORRESPONDING TO THE TOKEN INDICES IN AN ASCENDING OR DESCENDING ORDER OF THE INDICES

FIG. 7E

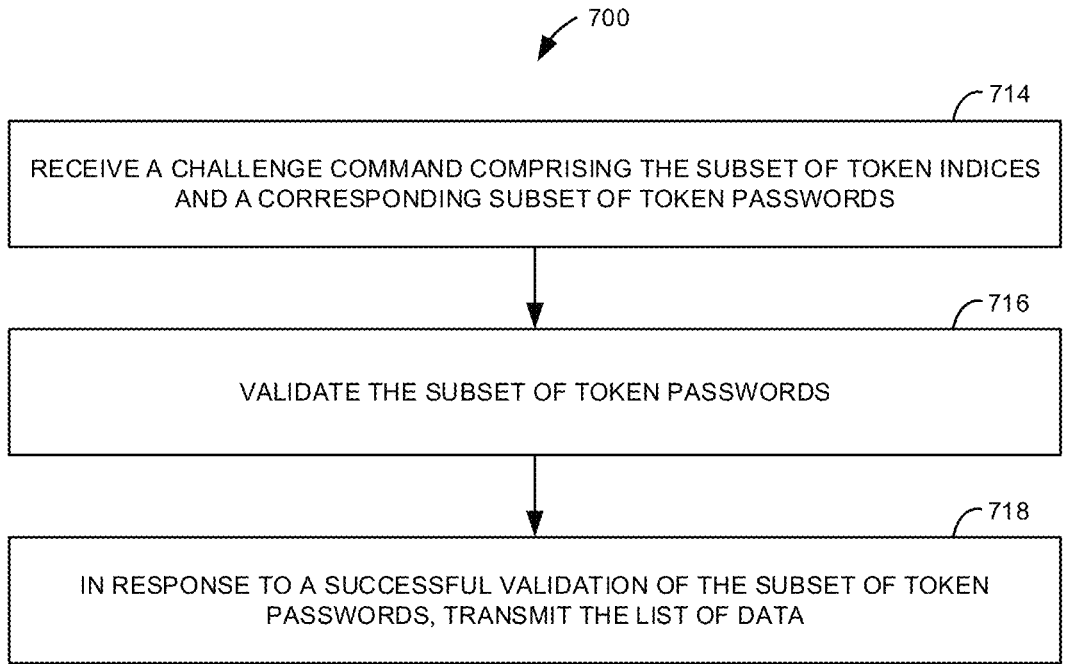

700

714

RECEIVE A CHALLENGE COMMAND COMPRISING THE SUBSET OF TOKEN INDICES AND A CORRESPONDING SUBSET OF TOKEN PASSWORDS

716

VALIDATE THE SUBSET OF TOKEN PASSWORDS

718

IN RESPONSE TO A SUCCESSFUL VALIDATION OF THE SUBSET OF TOKEN PASSWORDS, TRANSMIT THE LIST OF DATA

FIG. 7F

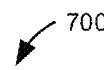

700

720

AFTER A CONNECTION TO A DIFFERENT HOST LOGIC CIRCUIT AND IN RESPONSE TO RECEIVING AT LEAST ONE NEW CHALLENGE COMMAND FROM THAT DIFFERENT HOST LOGIC CIRCUIT, THE AT LEAST ONE NEW CHALLENGE COMMAND COMPRISING A NEW SUBSET OF TOKEN INDICES, TRANSMIT TO THE DIFFERENT HOST LOGIC CIRCUIT A LIST OF DATA INCLUDING A NEW SUBSET OF TOKENS OF THE PLURALITY OF TOKENS CORRESPONDING TO THE RECEIVED NEW SUBSET OF TOKEN INDICES AND AN IMAGE OF EACH TOKEN OF REMAINING TOKENS OF THE PLURALITY OF TOKENS NOT CORRESPONDING TO THE RECEIVED NEW SUBSET OF TOKEN INDICES

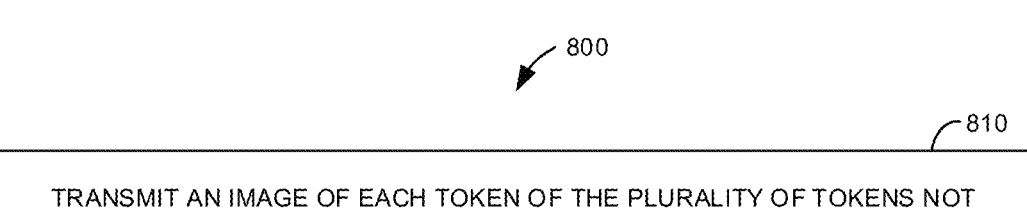

TRANSMIT AN IMAGE OF EACH TOKEN OF THE PLURALITY OF TOKENS NOT CORRESPONDING TO THE RECEIVED SUBSET OF TOKEN INDICES

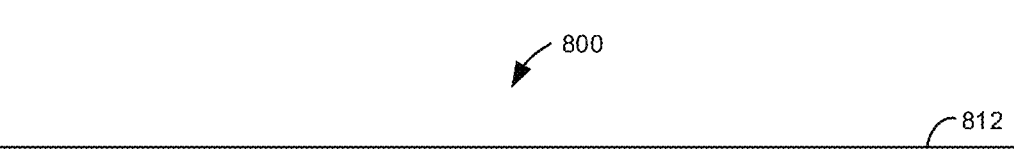

TRANSMIT, OVER A PLURALITY OF TRANSMISSIONS TO THE HOST LOGIC CIRCUIT, A LIST OF DATA COMPRISING THE TOKENS CORRESPONDING TO THE SUBSET OF TOKEN INDICES AND THE IMAGES OF RESPECTIVE TOKENS OF THE PLURALITY OF TOKENS NOT CORRESPONDING TO THE RECEIVED SUBSET OF TOKEN INDICES, IN RESPONSE TO A PLURALITY OF CHALLENGE COMMANDS

FIG. 8C

LOGIC CIRCUITRY PACKAGES STORING TOKENS

CROSS-REFERENCE TO RELATED APPLICATIONS

The present application is a Bypass Continuation of International Patent Application No.: PCT/US2023/027422, filed Jul. 11, 2023, which is incorporated herein by reference in its entirety.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies, etc.), inkjet printhead assemblies, and the like. In some examples, logic circuitry associated with the replaceable print apparatus component(s) communicates with logic circuitry of the print apparatus in which they are installed, for example communicating information such as their identity, capabilities, status, and the like. Similarly, other communication systems use logic circuits to connect to a host logic circuit, of which general examples include network communication systems, life science applications, automotive industry, the internet of things, etc.

Many instances of logic circuitry include at least one authentication function intended to verify the authenticity of a component, and which may also be used for secure communication. In some instances, the authentication function can be compromised after attempts to attack and/or hack the logic circuitry and/or the print apparatus by unauthorized third parties.

BRIEF DESCRIPTION OF THE DRAWINGS

FIGS. 7A-7G are flow diagrams illustrating example methods that may be carried out by a logic circuit.

FIGS. 8A-8C are flow diagrams illustrating other example methods that may be carried out by a logic circuit.

DETAILED DESCRIPTION

Figure 1:
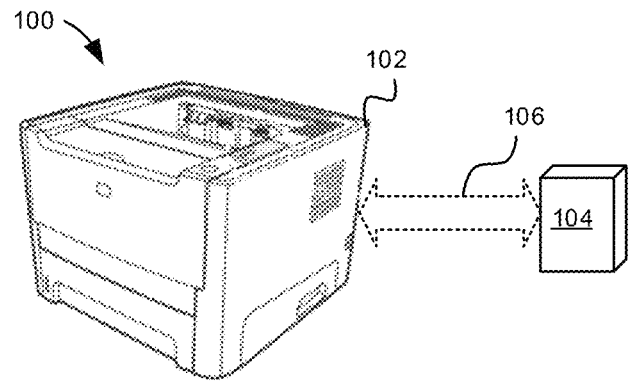
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that each individual feature or combination of features of the various examples described herein may be combined, in part or whole, with each other individual feature or combination of features.

Some examples of applications described herein are in the context of print apparatus. Not all the examples, however, are limited to such applications, and at least some of the principles set out herein may be used in other contexts.

Certain non-authorized third parties attempt to reverse engineer parts of Original Equipment Manufacturers (OEMs) or otherwise authorized parties to connect to apparatuses of OEMs or otherwise authorized parties. Authorized parties include parties in the authorized chain that may include OEMs, suppliers, developers, etc., for example authorized by intellectual property rights or otherwise associated with these parts and apparatus, while non-authorized third parties may be third parties that try to at least partially copy the original logic circuits of these authorized parties to connect to the host apparatus of these authorized parties, without any pre-authorized relation with the authorized parties.

In one practical example, logic circuits may include microcontrollers attached, or configured to be attached, to print consumable cartridges, where the host print apparatus logic circuits may include printer controllers and/or printer microcontrollers. In this disclosure, the host logic circuit may be any host side microcontroller, controller, application specific integrated circuit (ASIC), or the like. The host logic circuit may sometimes be referred to, simply, as "host", while a "logic circuit" by itself should refer to the component-side logic circuit, not the host. In some instances, authentication solutions may use symmetric cryptography where base keys are repeatedly used in logic circuits of print consumable cartridges to derive session keys used to validate commands and/or generate responses. Such repeated use of the base keys allows an attacker more opportunities to attack the keys. Authentication solutions using symmetric cryptography may use master keys (or other parent keys) in the host. This allows an attacker the opportunity to recover more valuable keys than the keys in the print consumable cartridges. In other instances, authentication solutions may use asymmetric cryptography, which may repeatedly use private keys in the print consumable cartridges to generate responses. Such repeated use of the private keys allows an attacker more opportunities to attack the keys. Asymmetric keys are more susceptible to both physical and side-channel attacks than symmetric keys.

As said, logic circuitry packages may be associated with print apparatus components such as cartridges or containers, and host logic circuits may be associated with host print apparatus to which the components are to be connected. In other examples, logic circuits do not need to be associated with print components or host print apparatus. Logic circuits can be used in conjunction with any Micro-Electrical Mechanical System, Lab-on-Chip, mobile computing device, and/or Life Science application. A wide range of applications require a logic circuitry package such as a microcontroller to securely connect to a host, physically and/or communicatively. The logic circuitry packages may connect to any type of host, for example any computing system, server, car system, apparatus for domestic use, access control systems, etc. While many examples of this disclosure involve logic circuitry packages and logic circuits for print apparatus components to connect to a host print apparatus logic circuit, the features of logic circuitry packages can be applied outside of the field of printing, by itself or in association with any component, to connect to any type of host logic circuit, not necessarily associated with a print apparatus component or print apparatus, respectively. Hence, where this disclosure refers to a print apparatus and print apparatus component (or cartridge or container), or the like, the apparatus can be any apparatus and the component can be any component. Examples of this disclosure allow for a host logic circuit to securely identify and authenticate a logic circuit associated with a host, and some examples of this disclosure may allow for the logic circuit to securely identify and/or authenticate the host.

In certain examples, Inter-integrated Circuit ($I^2C$, or I2C, which notation is adopted herein) protocol allows at least one 'leader' (commonly referred to as a 'master') integrated circuit (IC) to communicate with at least one 'follower' (commonly referred to as a 'slave') IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below Y volts may indicate a logic "0", where X and Y are predetermined numerical values and Y is less than or equal to X. By generating an appropriate voltage in each of a series of clock periods, data can be communicated via a bus or another communication link. In some examples, the communication link may be a wireless communication link, such as a radio frequency (RF) repeater attached to the end of an I2C bus of a leader to communicate with an RF interface attached to a follower.

In at least some examples, a plurality of logic circuitry packages (each of which may be associated with a different replaceable print apparatus component or container) may be connected to an I2C bus. Certain example print material containers have follower logic that utilize I2C communications, although in other examples, other forms of digital or analog communications could also be used. In the example of I2C communication, a leader IC may generally be provided as part of the print apparatus (which may be referred to as the 'host') and a replaceable print apparatus component would comprise a 'follower' IC, although this need not be the case in all examples. There may be a plurality of follower ICs connected to an I2C communication link or bus (for example, containers of different colors of print agent). At least one address of the logic circuitry package may be an I2C compatible address (herein after, an I2C address), for example in accordance with an I2C protocol, to facilitate directing communications between leader to followers in accordance with the I2C protocol. The follower IC(s) may include a processor to perform data operations before responding to requests from logic circuitry of the print system. In certain examples, the follower IC, or logic circuitry package, of this disclosure may be connected to or integrated with any print apparatus component that can be or is connected to or integrated with a print apparatus. For example, the logic circuitry package or follower IC of this disclosure may be connected to a non-replaceable print apparatus component. In other examples, other forms of digital and/or analog communication can be used, other than I2C.

Communications between print apparatus and replaceable print apparatus components installed in the apparatus (and/ or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component, such as a replaceable print consumable (e.g., ink, toner) cartridge. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus) logic circuit. One type of request may include a request for data, for example identification and/or authentication information. Another type of request may be a request for a data processing action. There may be additional types of requests. In this disclosure, a command is also a type of request.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The print material may be a consumable print material to be consumed by dispensing or transferring. In this disclosure, a print material, print consumable, or consumable print material may be the same thing, examples of which are indicated between parentheses above. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuitry packages by themselves to adhere to corresponding print apparatus components and communicate to a compatible print apparatus logic circuit.

Figure 2:
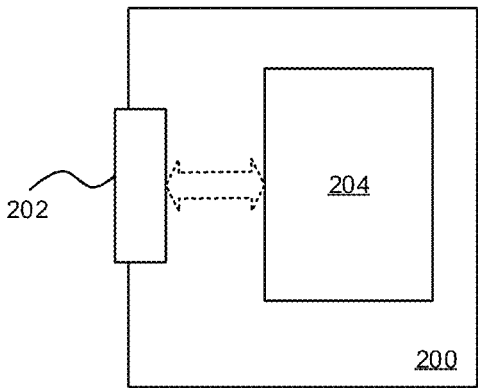
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'follower' in I2C communications.

Figure 3:
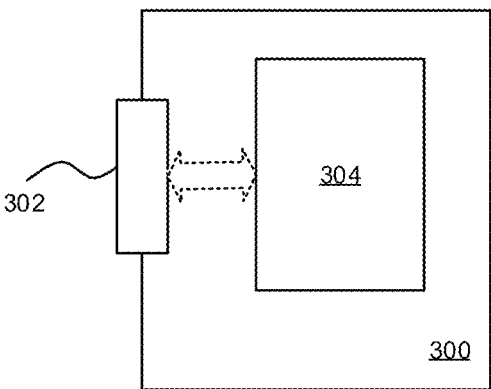
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a print apparatus logic circuit 304, such as a controller. In some examples, the interface 302 is an I2C interface.

In some examples, the print apparatus logic circuit 304 may be configured to act as a host, or a leader, in I2C communications. The print apparatus logic circuit 304 may generate and send commands to at least one replaceable print apparatus component 200, and may receive and decode responses received therefrom. In other examples, the print apparatus logic circuit 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years. Even when the same version of said apparatus 102, 300 is not available anymore for purchase, the same apparatus continues to be used for printing in homes and offices. In contrast, during those subsequent years where the apparatus 102, 300 cannot be purchased anymore, replaceable print apparatus components 104, 200 may still be purchased to facilitate printing with said apparatus 102, 300. The print apparatus component logic circuits are upgraded over the years, for example to be compatible with the newer versions of print apparatuses. The same upgraded print apparatus component logic circuits may be kept backward-compatible to older versions of print apparatuses to be compatible with a broad variety of print apparatuses including both older and newer versions. It may be advantageous for an original equipment manufacturer (OEM) to produce print apparatus component logic circuits that are compatible with a broad variety of print apparatuses 102, 300, for example, to avoid needing to support multiple hardware versions and to avoid stock keeping unit (SKU) proliferation of the print apparatus component logic circuits. Therefore, there may be at least a degree of forwards and/or backwards compatibility between print apparatus 102, 300 and replaceable print apparatus components 104, 200.

Figure 4:
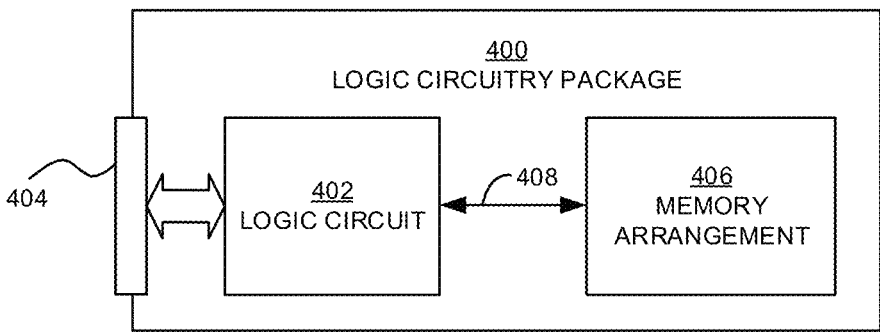
FIG. 4 illustrates one example of a logic circuitry package.

FIG. 4 illustrates one example of a logic circuitry package 400, which may for example provide the logic circuitry package 204 described in relation to FIG. 2. The logic circuitry package 400 may be associated with, or in some examples affixed to and/or be incorporated at least partially within, a replaceable print apparatus component 200.

Logic circuitry package 400 includes a logic circuit 402, an interface 404, and a memory arrangement 406. In some examples, the interface 404 is an I2C interface. Logic circuit 402 is communicatively coupled to memory arrangement 406 through a communication link 408. Memory arrangement 406 may include a single or multiple memory devices, and may include any or any combination of volatile memory (e.g., Dynamic Random Access Memory (DRAM), Static Random Access Memory (SRAM), registers, etc.) and non-volatile memory (e.g., Read Only Memory (ROM), Electrically Erasable Programmable Read Only Memory (EE-PROM), Flash, Erasable Programmable Read Only Memory (EPROM), memristor, etc.). In some examples, as described in more detail below with reference to FIGS. 6A and 6B, memory arrangement 406 stores a plurality of tokens. The tokens ($600_1$ to $600_N$) may be authentication codes, secrets, or passwords (although, in this disclosure, the word "password" is assigned to passwords in a challenge command from the host, to be used in validation by the logic circuit, as will be described further below). In other examples, memory arrangement 406 may alternatively, or in addition, store a plurality of password check values and/or a certificate. The certificate may include a token image digest and a component ID.

The example logic circuits disclosed herein may raise the bar for third parties to reverse engineer the logic circuits to connect to counterpart print apparatus logic circuits. In one practical example, the logic circuits may comprise microcontrollers attached, or configured to be attached, to print consumable cartridges, where the print apparatus logic circuits may comprise printer controllers and/or printer microcontrollers. The example functionalities of logic circuits disclosed herein do not require the repeated use of the same secret key(s) in the replaceable print cartridge, thereby minimizing exposure. The disclosed functionalities of the logic circuits do not require any secret keys in the host, thereby reducing the attractiveness of the host as an attack surface, which sometimes can be more damaging. In addition, by utilizing device-specific secrets (e.g., tokens) in the genuine (OEM) replaceable print cartridges, security is improved by forcing a part-by-part attack to make corresponding emulated logic circuits. Also, some of the disclosed functionalities are different than asymmetric key authentication, which is known to be susceptible to both physical and side-channel attacks.

Figure 5:
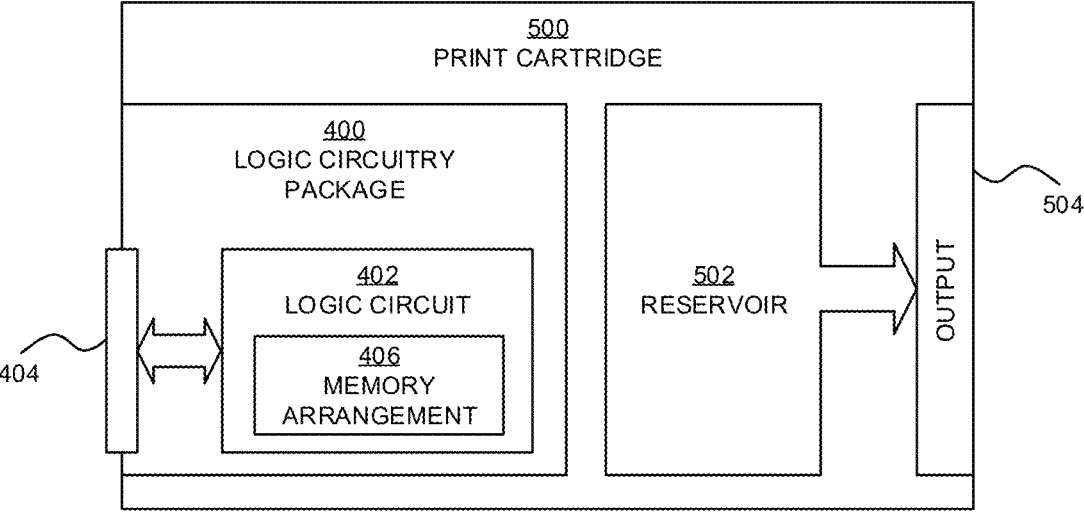
FIG. 5 illustrates one example of a replaceable print cartridge.

FIG. 5 illustrates one example of a replaceable print cartridge 500, such as a print consumable cartridge. Print cartridge 500 may provide the replaceable print apparatus component 104 of FIG. 1 or the replaceable print apparatus component 200 of FIG. 2. Print cartridge 500 includes a logic circuitry package 400 including logic circuit 402, interface 404, and memory arrangement 406. In this example, logic circuit 402 includes the memory arrangement 406. In addition, print cartridge 500 includes a reservoir 502 to hold consumable material and an output 504 to dispense the consumable material. The consumable material may include ink, dry toner, liquid toner, a 3D print agent (e.g., a print enhancement agent, a print inhibiting agent, a build powder, such as a plastic powder or a metal powder), or another suitable consumable.

Figure 6A:
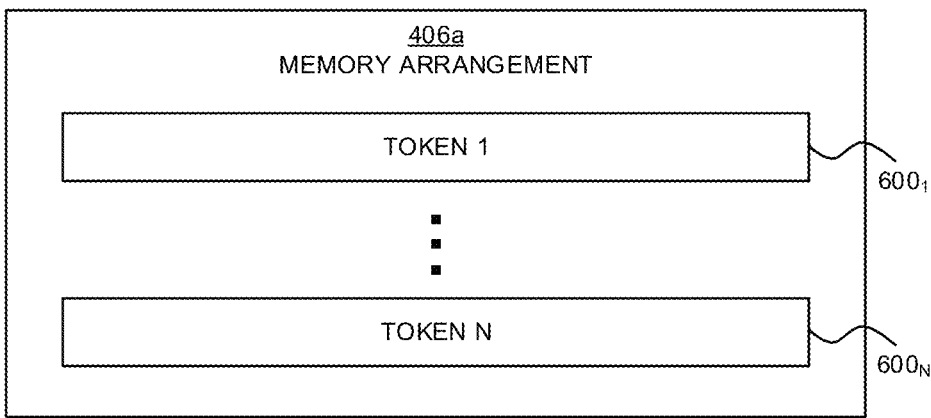
FIGS. 6A and 6B illustrate example memory arrangements.

FIG. 6A illustrates one example of a memory arrangement 406a. In some examples, memory arrangement 406a may provide memory arrangement 406 of FIG. 4 or 5. Memory arrangement 406a stores a plurality of tokens $600_1$ to $600_N$, where "N" is any suitable number of tokens. In one example, N equals 64. Each of the plurality of tokens $600_1$ to $600_N$ corresponds to a respective token index (e.g., 1 to N), such that each token $600_1$ to $600_N$ may be identified by referencing the respective token index. Each token $600_1$ to $600_N$ is a secret value (e.g., challenge value) having a specified length, such as a given number of bytes (e.g., 4 bytes, 8 bytes, 16 bytes, etc.). The value of each token $600_1$ to $600_N$ may be unique within the plurality of tokens. In addition, the values of each token $600_1$ to $600_N$ may be different for different replaceable print cartridges. That is, a memory arrangement 406a of one replaceable print cartridge may store a plurality of tokens $600_1$ to $600_N$ including a first set of values, while a memory arrangement 406a of another replaceable print cartridge may store a plurality of tokens $600_1$ to $600_N$ including a second set of values different from the first set of values. As will be described below, the plurality of tokens $600_1$ to $600_N$ may be used to validate and/or authenticate the replaceable print cartridge when the replaceable print cartridge is first installed in a host print apparatus, or some time after installment.

In some examples, a single token or multiple tokens of the plurality of tokens $600_1$ to $600_N$ may be stored in memory arrangement 406a in a non-encrypted format. In other examples, a single token or multiple tokens of the plurality of tokens $600_1$ to $600_N$ may be stored in memory arrangement 406a in an encrypted format.

In other examples, rather than being stored in memory arrangement 406a, the plurality of tokens $600_1$ to $600_N$ may be generated by the logic circuit 402 (FIGS. 4-5). The plurality of tokens $600_1$ to $600_N$ may be generated based on a seed value and/or algorithm that may be stored in memory arrangement 406a. In some examples, regardless of tokens (or other data) being generated in situ, or stored in encrypted or unencrypted format in the memory arrangement 406a, the logic circuit 402 may be configured to encrypt data for transmission to the host in situ as a separate layer of encryption, for example using a session key.

Figure 6B:
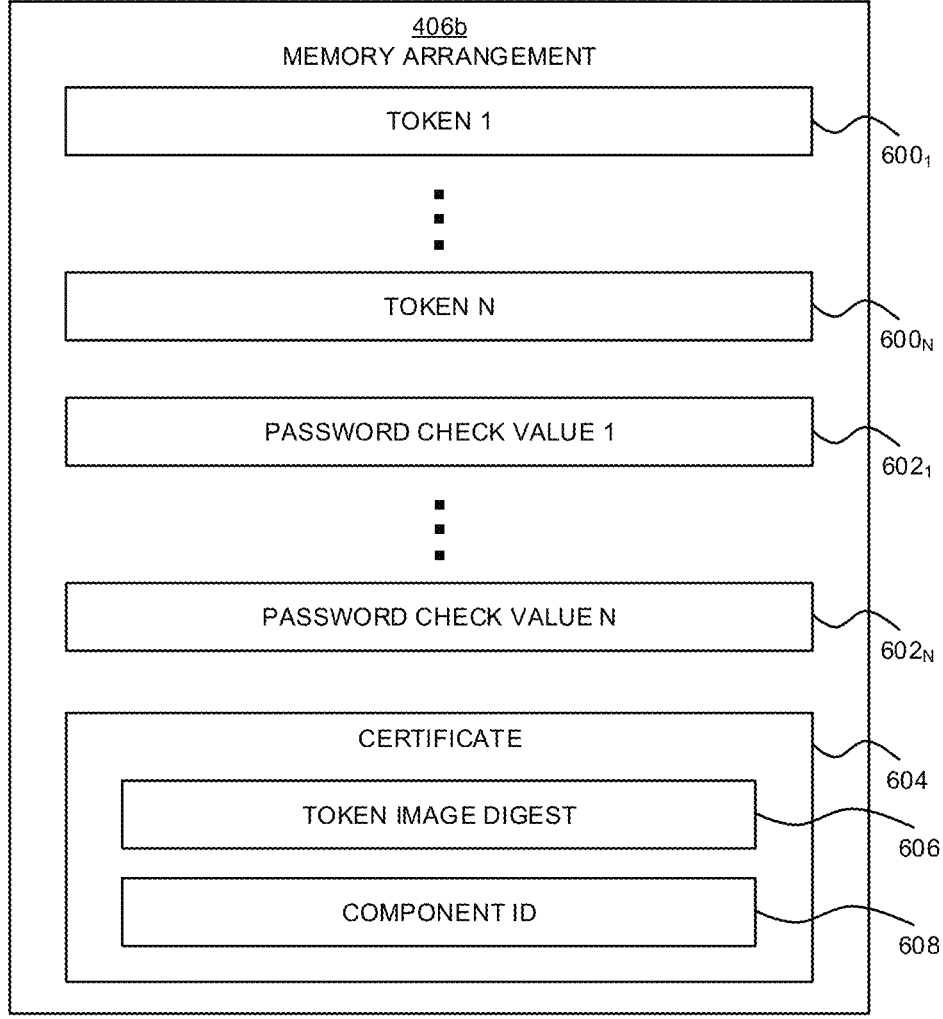

FIG. 6B illustrates another example of a memory arrangement 406b. In some examples, memory arrangement 406b may provide memory arrangement 406 of FIG. 4 or 5. The memory arrangement 406b stores the plurality of tokens $600_1$ to $600_N$ as previously described with reference to FIG. 6A. In addition, the memory arrangement 406b stores a certificate 604. Certificate 604 may include a token image digest 606 and a component ID 608.

Certificate 604 corresponds to the plurality of tokens $600_1$ to $600_N$. Certificate 604 may be referred to as a replaceable print apparatus component certificate. Certificate 604 may be transmitted to a host print apparatus logic circuit, for example, in response to a request from the host print apparatus logic circuit. Certificate 604 may be signed by a certificate signing private key to facilitate a host print apparatus logic circuit to validate the certificate using a public key corresponding to the certificate signing private key. In one example, the certificate signing private key is a certificate authority private key.

The token image digest 606 includes a digest of a plurality of token images corresponding to the respective plurality of tokens $600_1$ to $600_N$. The image of each token of the plurality of token images may be a hash (or truncated hash) of each token of the plurality of tokens $600_1$ to $600_N$. In this disclosure, truncated hashes are to be interpreted as a species of hashes. The length of each hash of each token $600_1$ to $600_N$ may be the same as the length of each token $600_1$ to $600_N$ (e.g., 4 bytes, 8 bytes, 16 bytes, etc.). The digest of the plurality of token images may be a hash (or truncated hash) of the plurality of token images. Thus, the token image digest 606 may be a hash of the hashes of the plurality of tokens $600_1$ to $600_N$. The length of the token image digest 606 may be the same as the length of one token (e.g., 4 bytes, 8 bytes, or 16 bytes, etc.). For example, the token image digest may be defined as: hash [hash of token 1|hash of token 2|hash of token 3| hash of token N]. In the previous phrase, the "|" symbol indicates concatenation.

Component ID 608, or, simply, ID 608, identifies the replaceable print apparatus component, or, in case the logic circuitry package is to be unattached to a component, the logic circuitry package. The value of the component ID 608 may be unique for each replaceable print apparatus component. In some examples, the component ID 608 may be used by a host print apparatus logic circuit to determine whether the replaceable print apparatus component is newly installed in the host print apparatus or whether the replaceable print apparatus component was previously installed in the host print apparatus. In other examples, component ID 608 may be used by a host print apparatus logic circuit to derive passwords based on a master password or a set of master passwords that correspond to the password check values $602_1$ to $602_N$.

In one example, the memory arrangement 406b stores a plurality of password check values $602_1$ to $602_N$. Each of the plurality of password check values $602_1$ to $602_N$ corresponds to a respective token of the plurality of tokens $600_1$ to $600_N$. Each password check value $602_1$ to $602_N$ may be a secret value having a specified length, such as a given number of bytes (e.g., 4 bytes, 8 bytes, 16 bytes, etc.). In one example, each password check value $602_1$ to $602_N$ is a password. In other examples, each password check value $602_1$ to $602_N$ is a hash of a password. The value of each password check value $602_1$ to $602_N$ may be unique within the plurality of password check values. In addition, the value of each password check value $602_1$ to $602_N$ may be different for different replaceable print cartridges. That is, a memory arrangement 406b of one replaceable print cartridge may store a plurality of password check values $602_1$ to $602_N$ including a first set of values, while a memory arrangement 406b of another replaceable print cartridge may store a plurality of password check values $602_1$ to $602_N$ including a second set of values different from the first set of values. As will be described below, the plurality of password check values $602_1$ to $602_N$ may be used to validate and/or authenticate at least one challenge command from the host, whereby such command, or command sequence, may also include token indices, and whereby the check values may be used to check those passwords.

In some examples, certificate 604 and/or the plurality of password check values $602_1$ to $602_N$ may be stored in memory arrangement 406*b* in a non-encrypted format. In other examples, certificate 604 and/or a single password check value or multiple password check values of the plurality of password check values $602_1$ to $602_N$ may be stored in memory arrangement 406*b* in an encrypted format.

In other examples, rather than being stored in memory arrangement 406*b*, the certificate 604 and/or the plurality of password check values $602_1$ to $602_N$ may be generated by the logic circuit 402 (FIGS. 4-5). The plurality of password check values $602_1$ to $602_N$ may be generated based on a seed value and/or algorithm that may be stored in memory arrangement 406*b*.

FIGS. 7A-7G are flow diagrams illustrating example methods 700 that may be carried out by a logic circuit, such as the logic circuit 402 of FIG. 4 or 5. The logic circuit may be part of a logic circuitry package (e.g., 400 of FIG. 4 or 5) for a replaceable print apparatus component (e.g., 500 of FIG. 5) including an interface (e.g., 404 of FIG. 4 or 5) to communicate with a print apparatus logic circuit (e.g., 304 of FIG. 3) as previously described. In this example, the memory arrangement stores a plurality of tokens (e.g., tokens $600_1$ to $600_N$ of FIG. 6A) corresponding to respective token indices (e.g., 1 to N). In other examples, the logic circuit may generate the plurality of tokens.

As illustrated in FIG. 7A at 702, the logic circuit is configured to receive (e.g., from a host logic circuit) at least one challenge command comprising a subset of token indices. In one example, the subset of token indices includes a list of 4 token indices. For example, the challenge command may include a command identifier (e.g., encoded as a number, such as 10="CHALLENGE") followed by a list of token indices (e.g., "4, 25, 36, 51"). In other examples, the subset of token indices may include a list of any suitable number of token indices. The subset of token indices may include a list of indices identifying any subset of the plurality of tokens and may include sequential or non-sequential indices and/or predetermined or random indices. The list of indices may be in ascending order, descending order, or a random order. The at least one challenge command, as well as any command from the host and response from the logic circuit, may be symmetrically authenticated.

At 704, the logic circuit is configured to in response to the at least one challenge command, transmit (e.g., to a host logic circuit) a list of data including a subset of tokens of the plurality of tokens corresponding to the received subset of token indices and an image of each token of remaining tokens of the plurality of tokens not corresponding to the received subset of token indices. In some examples, the image of each token of the remaining tokens of the plurality of tokens includes a hash of each token of the remaining tokens of the plurality of tokens. Accordingly, the list of data includes each token stored in the memory arrangement that was identified by a token index in the at least one challenge command. In addition, the list of data includes an image of each token that was not identified by a token index in the challenge command. As previously described, the image of each token may be a hash of each token. The hash of each token may be computed by the logic circuit prior to transmitting the list of data. In other examples, the hash of each token may be stored in the memory arrangement (e.g., in a non-encrypted or encrypted format).

A challenge command is any command that invokes the logic circuit to transmit the requested tokens of the indices of the command and token images of remainder not-identified tokens. Tokens and token images, together corresponding to all of the plurality of stored tokens, may be transmitted in a plurality of transmissions and likewise more than one challenge command may be needed to request those tokens and token images.

As illustrated in FIG. 7B at 706, the logic circuit may be further configured to transmit the list of data over a plurality of transmissions to the host logic circuit. As illustrated in FIG. 7C at 708, the logic circuit may be further configured to transmit the list of data over a plurality of transmissions to the host logic circuit, in response to a plurality of challenge commands (e.g., from the host logic circuit). The skilled person will understand that FIGS. 7B and/or 7C may complement FIG. 7A. In one example, the list of data is transmitted over two transmissions, where each transmission corresponds to approximately one half of the indices. For example, one half of the list of data (e.g., for indices 1-32) may be transmitted to the host logic circuit in a first transmission in response to a first challenge command from the host logic circuit, and the other half of the list of data (e.g., for indices 33-64) may be transmitted to the host logic circuit in a second transmission in response to a second challenge command from the host logic circuit. In other examples, the list of data may be divided between more than two transmissions to the host logic circuit. In one example, the second and/or any subsequent challenge command following the first challenge command to a particular logic circuit may exclude the list of token indices. In this case, for example, the second and/or any subsequent challenge command may include only a command identifier (e.g., "CHALLENGE").

As illustrated in FIG. 7D at 710, the logic circuit may be further configured to transmit a token image digest (e.g., 606 of FIG. 6B) of a plurality of token images, each token image of the plurality of token images corresponding to a respective token of the plurality of tokens. In some examples, the token image digest includes a hash of the plurality of token images. In one example, the logic circuit is configured to transmit the token image digest in response to a request and/or challenge from the host.

As illustrated in FIG. 7E at 712, the logic circuit may be further configured to transmit the list of data corresponding to the token indices in an ascending or descending order of the indices. In other examples, the logic circuit may transmit the list of data corresponding to the token indices in a predetermined order.

As illustrated in FIG. 7F at 714, the logic circuit may be further configured to receive a challenge command comprising the subset of token indices and a corresponding subset of token passwords. For example, the challenge command may include a command identifier (e.g., "CHALLENGE") followed by a list of token indices (e.g., "4, 25, 36, 51"), which is followed by a list of token passwords (e.g., "password for token 4, password for token 25, password for token 36, password for token 51"). At 716, the logic circuit may be further configured to validate the subset of token passwords. At 718, the logic circuit may be further configured to in response to a successful validation of the subset of token passwords, transmit the list of data. In some examples, the memory arrangement stores password check values (e.g., $602_1$ to $602_N$ of FIG. 6B), and the logic circuit is configured to validate the subset of token passwords using the check values.

In some examples, where the password check values stored in the memory arrangement are passwords, the logic circuit may validate the subset of token passwords by comparing each token password of the subset of token passwords to the corresponding password check value. In other examples, where the password check values stored in the memory arrangement are hashes of the passwords, the logic circuit may validate the subset of token passwords by computing the hash of each token password and comparing the hash of each token password to the corresponding password check value. The corresponding password check values may be identified based on the subset of token indices, since the indices of the password check values correspond to the indices of the tokens. If all the token passwords of the subset of token passwords are individually validated, then the subset of token passwords are validated. If any of the token passwords of the subset of token passwords is not individually validated, then the subset of token passwords are not validated and the logic circuit may not transmit the list of data. In other examples, the logic circuit may be configured to ignore the subset of token passwords and transmit the list of data without validating the subset of token passwords. In other examples, the logic circuit may validate the token passwords using other suitable methods.

As illustrated in FIG. 7G at 720, the logic circuit may be further configured to, after a connection to a different host logic circuit and in response to receiving at least one new challenge command from that different host logic circuit, the at least one new challenge command comprising a new subset of token indices, transmit to the different host logic circuit a list of data including a new subset of tokens of the plurality of tokens corresponding to the received new subset of token indices and an image of each token of remaining tokens of the plurality of tokens not corresponding to the received new subset of token indices. Note that the new subset of token indices may be generated by a different host logic circuit, for example at random, whereby it is most likely that the new subset of token indices is different from the earlier subset of token indices generated by the first host logic circuit. However, it is theoretically not impossible that the new subset of token indices includes one or more of the same indices as the earlier subset of token indices, or the subset may even be completely the same in the most unlikely scenario. In one example, the logic circuit may be further configured to not transmit more than a predetermined threshold of tokens (e.g., 4) of the plurality of tokens to a respective connected host logic circuit. In other examples, the logic circuit may be further configured to transmit the lists of data to not more than a predetermined maximum (e.g., 4) of distinct host logic circuits. In this way, the replaceable print apparatus component may only be used with a limited number of host print apparatuses. If a maximum of four tokens can be transmitted to each of a maximum of four distinct host logic circuits, then this implies that a minimum of 48 tokens remain hidden for attackers.

Figure 8A:
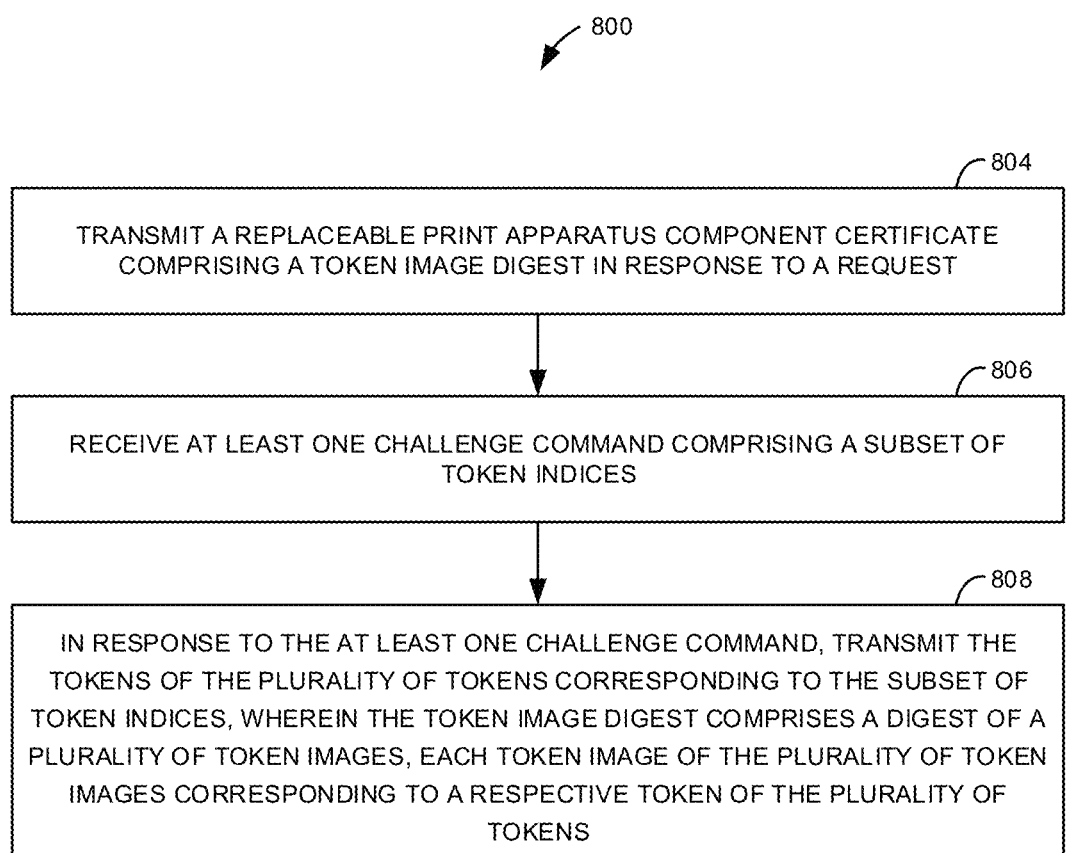

FIGS. 8A-8C are flow diagrams illustrating other example methods 800 that may be carried out by a logic circuit, such as the logic circuit 402 of FIG. 4 or 5. The same logic circuit 402 may be configured to carry out the example methods of FIGS. 8A-8C and 7A-7G. The skilled person will understand that example logic circuits of this disclosure are configured to carry out the individual steps as well as any combination of steps of any of the FIGS. 8A-8C and 7A-7G.

The logic circuit may be part of a replaceable print cartridge (e.g., 500 of FIG. 5) including a print consumable (e.g., within reservoir 502 of FIG. 5) and an interface (e.g., 404 of FIG. 4 or 5) to communicate with a print apparatus logic circuit (e.g., 304 of FIG. 3) as previously described. The logic circuit may include a memory arrangement (e.g., 406 of FIG. 4 or 5) storing a plurality of tokens (e.g., tokens $600_1$ to $600_N$ of FIG. 6A) corresponding to respective token indices (e.g., 1 to N).

As illustrated in FIG. 8A at 804, the logic circuit is configured to transmit a replaceable print apparatus component certificate (e.g., 604 of FIG. 6B) comprising a token image digest (e.g., 606 of FIG. 6B) in response to a request. At 806, the logic circuit is configured to receive at least one challenge command comprising a subset of token indices. At 808, the logic circuit is configured to in response to the at least one challenge command, transmit the tokens of the plurality of tokens corresponding to the subset of token indices, wherein the token image digest comprises a digest of a plurality of token images, each token image of the plurality of token images corresponding to a respective token of the plurality of tokens.

The replaceable print apparatus component certificate may include a unique replaceable print apparatus component ID (e.g., 608 of FIG. 6B) signed with a certificate signing private key to facilitate the host print apparatus logic circuit to validate the replaceable print apparatus component certificate using a public key corresponding to the certificate signing private key.

As illustrated in FIG. 8B at 810, the logic circuit may be further configured to transmit an image of each token of the plurality of tokens not corresponding to the received subset of token indices. As illustrated in FIG. 8C at 812, already discussed with reference to FIGS. 7A, 7B and 7C, the logic circuit may be further configured to transmit, over a plurality of transmissions to the host logic circuit, a list of data comprising the tokens corresponding to the subset of token indices and the images of respective tokens of the plurality of tokens not corresponding to the received subset of token indices, in response to a plurality of challenge commands. In one example, the image of each token of the plurality of tokens not corresponding to the received subset of token indices may include a hash of each token of the plurality of tokens not corresponding to the received subset of token indices.

Figure 9A:
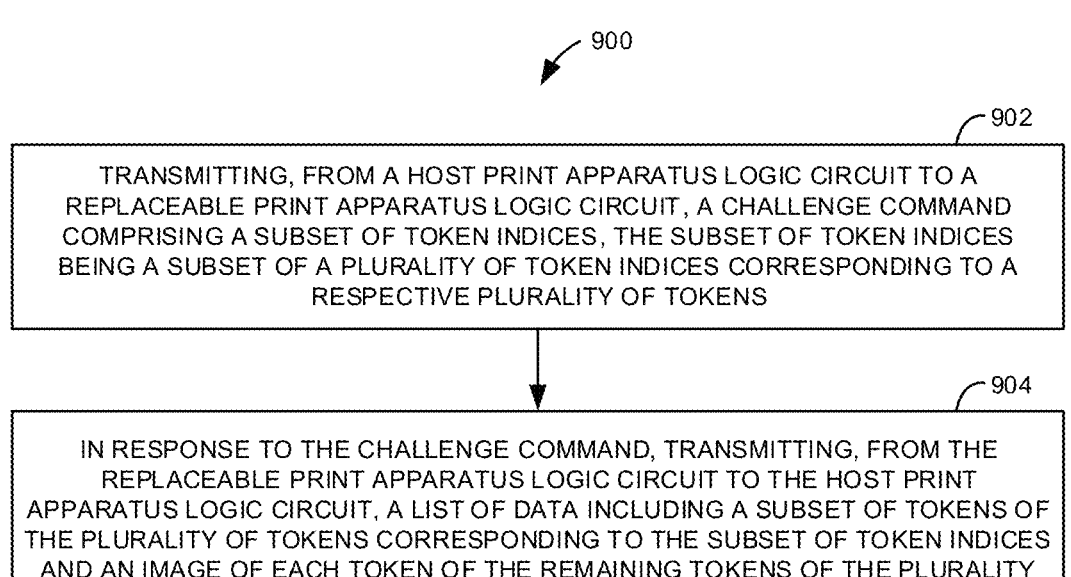
FIGS. 9A and 9B are flow diagrams illustrating example methods for operating a printing system.
Figure 9B:
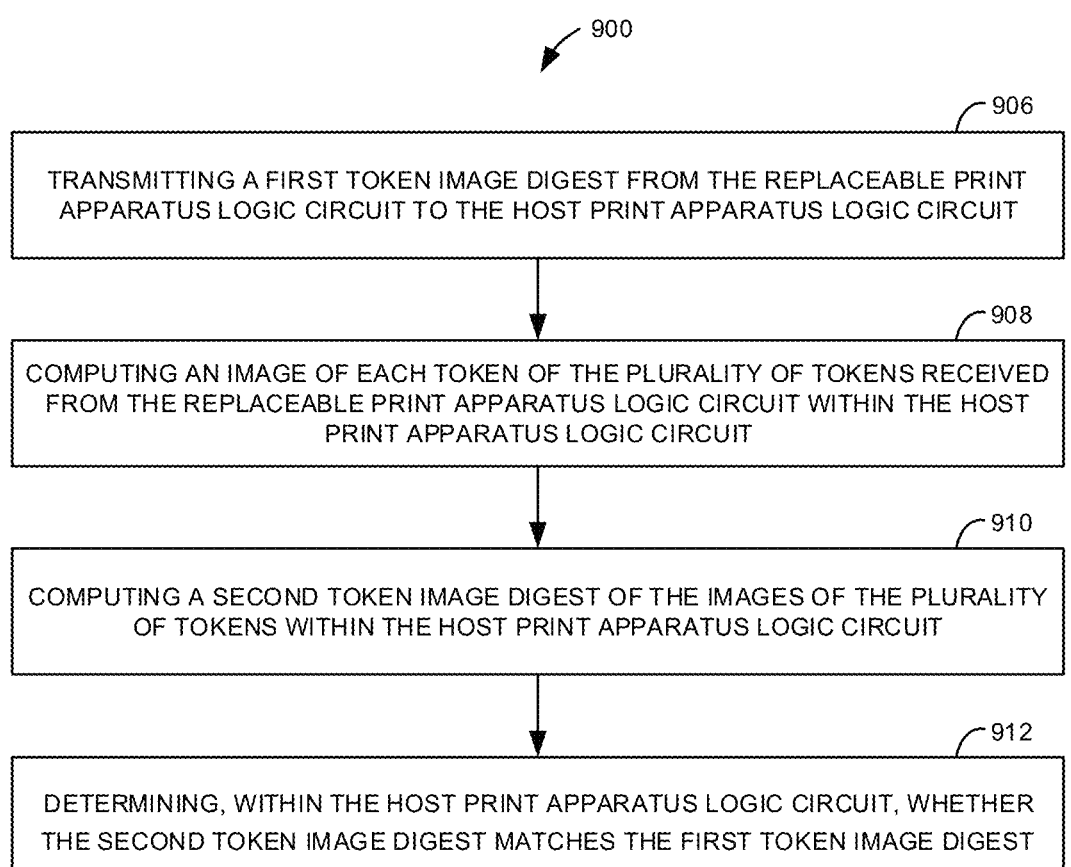

FIGS. 9A and 9B are flow diagrams illustrating example methods 900 for operating a printing system, such as printing system 100 of FIG. 1. As illustrated in FIG. 9A at 902, method 900 may include transmitting, from a host print apparatus logic circuit (e.g., 300 of FIG. 3) to a replaceable print apparatus logic circuit (e.g., 200 of FIG. 2 or 402 of FIG. 4 or 5), a challenge command comprising a subset of token indices, the subset of token indices being a subset of a plurality of token indices corresponding to a respective plurality of tokens (e.g., $600_1$ to $600_N$ of FIG. 6A). At 904, method 900 may include in response to the challenge command, transmitting, from the replaceable print apparatus logic circuit to the host print apparatus logic circuit, a list of data including a subset of tokens of the plurality of tokens corresponding to the subset of token indices and an image of each token of the remaining tokens of the plurality of tokens not corresponding to the subset of token indices. The image of each token of the remaining tokens of the plurality of tokens may include a hash of each token of the remaining tokens of the plurality of tokens. In one example, method 900 may further include transmitting the list of data corresponding to a first token index of the plurality of token indices to a last token index of the plurality of token indices in ascending or descending order.

As illustrated in FIG. 9B at 906, method 900 may further include transmitting a first token image digest (e.g., 606 of FIG. 6B) from the replaceable print apparatus logic circuit to the host print apparatus logic circuit. At 908, method 900 may further include computing an image of each token of the plurality of tokens received from the replaceable print apparatus logic circuit within the host print apparatus logic circuit. At 910, method 900 may further include computing a second token image digest of the images of the plurality of tokens within the host print apparatus logic circuit. At 912, method 900 may further include determining, within the host print apparatus logic circuit, whether the second token image digest matches the first token image digest. If the second token image digest matches the first token image digest, the list of data transmitted to the host print apparatus logic circuit in response to the challenge command is validated and the replaceable print apparatus component may be used by the host print apparatus. If the second token image digest does not match the first token image digest, the list of data transmitted to the host print apparatus logic circuit in response to the challenge command is not validated and the replaceable print apparatus component may not be used by the host print apparatus.

In one example, method 900 may further include transmitting a replaceable print apparatus logic circuit ID (e.g., 608 of FIG. 6B) from the replaceable print apparatus logic circuit to the host print apparatus logic circuit. The replaceable print apparatus logic circuit ID may be used by the host print apparatus logic circuit to identify the replaceable print apparatus logic circuit. In some examples, the host print apparatus logic circuit may store the replaceable print apparatus logic circuit ID so that if the host print apparatus logic circuit subsequently receives the same replaceable print apparatus logic circuit ID, the host print apparatus logic circuit can identify that the replaceable print apparatus was previously installed in the host print apparatus.

In certain examples of this disclosure, efficiency of communication may be enhanced by communicating a plurality, such as a maximum number, of tokens per host in a single communication. In a further example, requested tokens and non-requested token images can be returned in a single communication, contributing to communication efficiency. Certain example logic circuits validate passwords which may limit access to the functionalities of this disclosure. Furthermore, certain examples limit the access to the tokens by only communicating a maximum of tokens to a single host, and/or to a maximum number of hosts. Hence, certain examples of this disclosure may enhance efficiency and security of secure logic circuits such as secure microcontrollers, whereby in some examples no or little special hardware is needed for enabling the disclosed features.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices, and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array, etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, and "a" or "an" does not exclude a plurality.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

This disclosure addresses logic circuits comprising an interface to communicate with a host logic circuit. The logic circuit may be part of a package. The logic circuit may be a special purpose circuitry, such as a microcontroller, for example a secure microcontroller. The logic circuit may be configured to communicate with a print apparatus controller. The logic circuit may be attached to or embedded in, or be attachable to, a replaceable print cartridge or component. The host logic circuit may comprise or be part of a print apparatus logic circuit. The logic circuit and its features may be used in other applications, for example secure applications. In one example, the logic circuit may be configured to store and/or generate a plurality of tokens corresponding to respective token indices. The logic circuit may be configured to receive at least one challenge command from the host logic circuit comprising a subset of token indices. The logic circuit may be configured to, in response to the at least one challenge command, transmit a list of data including a subset of tokens of the plurality of tokens corresponding to the received subset of token indices and an image of each token of remaining tokens of the plurality of tokens not corresponding to the received subset of token indices. In another example, the logic circuit may be configured to store or generate a plurality of tokens corresponding to respective token indices. The logic circuit may be configured to transmit a certificate comprising a token image digest in response to a request. The logic circuit may be configured to receive at least one challenge command comprising a subset of token indices. The logic circuit may be configured to, in response to the at least one challenge command, transmit the tokens of the plurality of tokens corresponding to the subset of token indices, wherein the token image digest comprises a digest of a plurality of token images, each token image of the plurality of token images corresponding to a respective token of the plurality of tokens. Any of these example features may be combined with any of the following features. The logic circuit may comprise a memory arrangement storing the plurality of tokens corresponding to respective token indices. The logic circuit may be configured to transmit the list of data over a plurality of transmissions to the host logic circuit. The logic circuit may be configured to transmit the list of data over a plurality of transmissions to the host logic circuit, in response to a plurality of challenge commands from the host logic circuit. The list of data may be transmitted over two transmissions, each transmission corresponding to approximately one half of the indices. The logic circuit may be configured to transmit a token image digest of a plurality of token images, each token image of the plurality of token images corresponding to a respective token of the plurality of tokens. The token image digest may comprise a hash of the plurality of token images. The logic circuit may be configured to transmit the list of data corresponding to the token indices in an ascending or descending order of the indices. The image of each token of the remaining tokens of the plurality of tokens may comprise a hash of each token of the remaining tokens of the plurality of tokens. The logic circuit may be configured to receive at least one challenge command comprising the subset of token indices and a corresponding subset of token passwords. The logic circuit may be configured to validate the subset of token passwords. The logic circuit may be configured to, in response to a successful validation of the subset of token passwords, transmit the list of data. The memory arrangement may store password check values. The logic circuit may be configured to validate the subset of token passwords using the check values. The logic circuit may be configured to, after a connection to a different host logic circuit and/or in response to receiving at least one new challenge command from that different host logic circuit, whereby the at least one new challenge command may comprise a new subset of token indices, transmit to the different host logic circuit a list of data including a new subset of tokens of the plurality of tokens corresponding to the received new subset of token indices and/or an image of each token of remaining tokens of the plurality of tokens not corresponding to the received new subset of token indices. The logic circuit may be configured to not transmit more than a predetermined threshold of tokens of the plurality of tokens to a respective connected host logic circuit. The logic circuit may be configured to transmit the lists of data to not more than a predetermined maximum of distinct host logic circuits. The logic circuit may comprise a memory arrangement storing the plurality of tokens corresponding to respective token indices. The certificate may comprise a component ID signed with a certificate signing private key to facilitate the host logic circuit to validate the certificate using a public key corresponding to the certificate signing private key. The logic circuit may be configured to transmit an image of each token of the plurality of tokens not corresponding to the received subset of token indices. The logic circuit may be configured to transmit, for example over a plurality of transmissions to the host logic circuit, a list of data comprising the tokens corresponding to the received subset of token indices and/or the images of respective tokens of the plurality of tokens not corresponding to the received subset of token indices, in response to a plurality of challenge commands. The image of each token of the plurality of tokens not corresponding to the received subset of token indices may comprise a hash of each token of the plurality of tokens not corresponding to the received subset of token indices.

What is claimed is:

1. A logic circuitry package comprising an interface configured to communicate with a host logic circuit via a serial or packet-based digital communication protocol, and a logic circuit comprising a memory arrangement to:
    store or generate a plurality of device-specific tokens corresponding to respective token indices, the logic circuit being implemented as a secure microcontroller,
    wherein the logic circuit is configured to receive, via the interface, at least one challenge command from the host logic circuit comprising a command identifier and a subset of token indices; and
    wherein the logic circuit is configured to, in response to the at least one challenge command, transmit over two separate transmissions a list of data including for the received subset of token indices a corresponding subset of tokens of the plurality of device-specific tokens, and for each remaining token of the plurality of device-specific tokens not corresponding to the received subset of token indices, a respective token image;
    wherein the logic circuit is configured to:
        receive the at least one challenge command comprising the command identifier followed by the subset of token indices which is followed by a corresponding subset of token passwords, wherein the command identifier is encoded as a number;
        validate the subset of token passwords by comparing each token password of the subset of token passwords to a corresponding password check value stored in the memory arrangement identified based on the subset of token indices, wherein the password check values correspond to indices of the device-specific tokens, wherein all token passwords of the subset of token passwords must be individually validated for the subset of token passwords to be validated; and
        in response to a successful validation of the subset of token passwords, transmit the list of data, wherein if any of the token passwords of the subset of token passwords is not individually validated, then the subset of token passwords are not validated and the logic circuit does not transmit the list of data,
        wherein the list of data transmitted over the two separate transmissions corresponds collectively to all of the plurality of device-specific tokens.

2. The logic circuitry package of claim 1, wherein each of the two separate transmissions is in response to a respective challenge command from the host logic circuit.

3. The logic circuitry package of claim 1, wherein the logic circuit is configured to transmit a token image digest of a plurality of token images, each token image of the plurality of token images corresponding to a respective token of the plurality of tokens.

4. The logic circuitry package of claim 3, wherein the token image digest comprises a hash of the plurality of token images.

5. The logic circuitry package of claim 1, wherein the respective token image comprises a hash of each token of the remaining tokens of the plurality of tokens.

6. The logic circuitry package of claim 1, wherein the logic circuit is configured to, after a connection to a different host logic circuit and in response to receiving at least one new challenge command from that different host logic circuit, the at least one new challenge command comprising a new subset of token indices, transmit to the different host logic circuit a list of data including a new subset of tokens of the plurality of tokens corresponding to the received new subset of token indices and an image of each token of remaining tokens of the plurality of tokens not corresponding to the received new subset of token indices.

7. The logic circuitry package of claim 1, wherein the logic circuit is configured to not transmit more than a predetermined threshold of tokens of the plurality of tokens to a respective connected host logic circuit.

8. The logic circuitry package of claim 6, wherein the logic circuit is configured to transmit the lists of data to not more than a predetermined maximum of distinct host logic circuits.

9. A logic circuitry package comprising an interface configured to communicate with a host logic circuit via a serial or packet-based digital communication protocol, and a logic circuit comprising a memory arrangement to:

store or generate a plurality of device-specific tokens corresponding to respective token indices, the logic circuit being implemented as a secure microcontroller;

wherein the logic circuit is configured to transmit a certificate comprising a token image digest in response to a request;

wherein the logic circuit is configured to receive, via the interface, at least one challenge command comprising a command identifier and a subset of token indices; and wherein the logic circuit is configured, in response to the at least one challenge command, to transmit over two separate transmissions the tokens of the plurality of device-specific tokens corresponding to the subset of token indices;

wherein the logic circuit is configured to:

receive the at least one challenge command comprising the command identifier followed by the subset of token indices which is followed by a corresponding subset of token passwords, wherein the command identifier is encoded as a number;

validate the subset of token passwords by comparing each token password of the subset of token passwords to a corresponding password check value stored in the memory arrangement identified based on the subset of token indices, wherein the password check values correspond to indices of the device-specific tokens, wherein all token passwords of the subset of token passwords must be individually validated for the subset of token passwords to be validated; and in response to a successful validation of the subset of token passwords, transmit the tokens of the plurality of device-specific tokens corresponding to the subset of token indices, wherein if any of the token passwords of the subset of token passwords is not individually validated, then the subset of token passwords are not validated and the logic circuit does not transmit the tokens, wherein the token image digest comprises a digest of a plurality of token images, each token image of the plurality of token images corresponding to a respective token of the plurality of device-specific tokens.

10. The logic circuitry package of claim 9, wherein the certificate comprises a component ID signed with a certificate signing private key to facilitate the host logic circuit to validate the certificate using a public key corresponding to the certificate signing private key.

11. The logic circuitry package of claim 9, wherein the logic circuit is configured to transmit a respective token image for each token of the plurality of tokens not corresponding to the received subset of token indices.

12. The logic circuitry package of claim 11, wherein the logic circuit is configured to transmit, over a plurality of transmissions to the host logic circuit, a list of data comprising the tokens corresponding to the received subset of token indices and the images of respective tokens of the plurality of tokens not corresponding to the received subset of token indices, in response to a plurality of challenge commands.

13. The logic circuitry package of claim 11, wherein the respective token image for each token of the plurality of tokens not corresponding to the received subset of token indices comprises a hash of each token of the plurality of tokens not corresponding to the received subset of token indices.

14. A replaceable print cartridge or component comprising a logic circuitry package comprising an interface configured to communicate with a host logic circuit via a serial or packet-based digital communication protocol, and a logic circuit comprising a memory arrangement to:

store or generate a plurality of device-specific tokens corresponding to respective token indices, the logic circuit being implemented as a secure microcontroller, wherein the logic circuit is configured to receive, via the interface, at least one challenge command from the host logic circuit comprising a command identifier and a subset of token indices; and wherein the logic circuit is configured to, in response to the at least one challenge command, transmit over two separate transmissions a list of data including for the received subset of token indices a corresponding subset of tokens of the plurality of device-specific tokens, and for each remaining token of the plurality of device-specific tokens not corresponding to the received subset of token indices, a respective token image;

wherein the logic circuit is configured to:

receive the at least one challenge command comprising the command identifier followed by the subset of token indices which is followed by a corresponding subset of token passwords, wherein the command identifier is encoded as a number;

validate the subset of token passwords by comparing each token password of the subset of token passwords to a corresponding password check value stored in the memory arrangement identified based on the subset of token indices, wherein the password check values correspond to indices of the device-specific tokens, wherein all token passwords of the subset of token passwords must be individually validated for the subset of token passwords to be validated; and in response to a successful validation of the subset of token passwords, transmit the list of data, wherein if any of the token passwords of the subset of token passwords is not individually validated, then the subset of token passwords are not validated and the logic circuit does not transmit the list of data, wherein the list of data transmitted over the two separate transmissions corresponds collectively to all of the plurality of device-specific tokens.

* * * * *